United States Patent [19]
Coscia

[11] 3,726,310
[45] Apr. 10, 1973

[54] FLUID AMPLIFIED AUXILIARY RESERVOIR

[75] Inventor: Charles M. Coscia, Horseheads, N.Y.

[73] Assignee: The Bendix Corporation, Southfield, Mich.

[22] Filed: Feb. 18, 1971

[21] Appl. No.: 116,576

[52] U.S. Cl. .....................137/576, 417/79, 417/249
[51] Int. Cl. .................................................F04f 5/02
[58] Field of Search.....................417/249, 182.5, 77, 417/79–83, 151, 163, 471; 137/576

[56] References Cited

UNITED STATES PATENTS

| | | | |
|---|---|---|---|
| 2,953,156 | 9/1960 | Bryant | 137/576 X |
| 1,857,004 | 5/1932 | Rebillet | 417/80 X |
| 2,325,931 | 8/1943 | Avigdor | 417/79 X |
| 3,128,709 | 4/1964 | Arkless et al. | 417/81 |

*Primary Examiner*—Henry T. Klinksiek
*Attorney*—Bruce A. Yungman and Plante, Hartz, Smith & Thompson

[57] ABSTRACT

A fuel reservoir arranged about the intake or suction conduit of a fuel pump supply line in a fuel tank utilized by internal combustion engines, consisting of a container having a bottom and open or closed top and having a fuel receiving opening therein. A fuel jet directs return fuel through the opening into the container. The jet is positioned exterior of the container such that intank fuel is entrained from the primary tank in which the reservoir is located.

2 Claims, 2 Drawing Figures

PATENTED APR 10 1973          3,726,310

CHARLES M. COSCIA
INVENTOR.

BY 3,726,310

FLUID AMPLIFIED AUXILIARY RESERVOIR

FIELD OF THE INVENTION

The present invention relates to an apparatus provided in the fuel tank for internal combustion engines, especially of motor vehicles, for the purpose of damming-up or collecting a quantity of fuel sufficient for the supply of the internal combustion engine during the occurrence of accelerating forces acting on the vehicle in the form of a reservoir arranged about the intake or suction conduit of the fuel supply and/or the fuel pump itself and positioned at or near the fuel tank bottom.

DESCRIPTION OF THE PRIOR ART

It is known in the prior art to provide installations for use in fuel tanks of internal combustion engines which serve the purpose of damming-up, collecting and storing, especially with a relatively low fuel level in the tank, the fuel present within the tank during breaking and acceleration as well as during curve drives. These prior art devices dam-up, collect and store the fuel within the region of the fuel suction line, and are used, for example, in the form of relatively low partition walls extending in a transverse direction of the fuel tank and secured to the tank bottom ahead and/or behind the suction line. With such an installation, fuel under the influence of accelerating and decelerating forces is effectively dammed-up and collected by these partition walls. Other prior art arrangements are known in which an S-shaped vertically extending guide sheet metal strip is provided above the suction line in the fuel tank at the bottom thereof, whereby the fuel which runs off along the outer leg portions of the S-shaped strip is dammed-up and is thereby effectively conducted to the fuel suction line.

Furthermore, fuel tank constructions are known in the prior art, the inner space of which is subdivided in an S-shaped manner by means of sheet metal walls whereby an outlet is provided in each individual space. Additionally, it is known to form such S-shaped subdivisions by means of anti-roll baffle plates, also provided with a large number of small apertures.

It is also known in the prior art to arrange an anti-roll baffle box about the fuel supply line with the four side walls of the baffle box rigidly connected with the fuel tank bottom, which is thereby provided with apertures in proximity to the fuel tank bottom to enable therethrough the flow of fuel.

All of these prior art installations mentioned hereinabove, however, exhibit for the most part, considerable shortcomings and disadvantages.

For example, no definite assurance is given by the use of the particular damming-up walls and/or guide walls known in the prior art which are arranged only transversely to the driving direction, that a sufficient supply of fuel for the internal combustion engine is provided reliably under all possible conditions. Since it can be safely assumed that under normal driving conditions more accelerating forces for the fuel occur which are directed in the transverse direction of the vehicle in the form of centrifugal forces than in the longitudinal direction of the vehicle by reason of the more frequent occurrence of curved drives, often times no appreciable damming-up of the fuel or none at all take place with the occurrence of centrifugal forces to assure a safe and reliable supply of fuel with the prior art installations.

Additionally, there exists also the danger that the fuel will flow out of the immediate vicinity of the fuel outlet with the prior art constructions utilizing individual baffle plates provided with small connecting passages, not to mention the high constructional costs and expenses necessitated by such prior art installations.

Many of the shortcomings and disadvantages of the prior art devices mentioned above were purportedly obviated by even later devices. These devices consisted essentially of a damming-up and storage housing having an outer curved wall and an inner curved wall forming therebetween a spiral shaped inlet channel for the fuel in communication at the outer end thereof with the inside of the fuel tank, and in communication at the inner end thereof with the inside of the storing housing. The excess fuel is returned to the housing by means of a return line that discharges the excess fuel either directly into the inner housing of the storage housing, or by discharging the excess fuel from the fuel return line essentially tangentially into the inlet of the storage space. The inlet channel of these devices is formed by an inner and outer wall mounted directly to the fuel tank's bottom. However, these devices also had major disadvantages.

For example, the provision of a spiral shaped channel formed by at least one wall is difficult to mount or assemble to the fuel tank's bottom. Furthermore, the lack of a unitary design would cause these devices to be unstable, i.e., a shifting of components with normal usage, or in the alternative would demand extensive supporting structure insuring proper alignment of the fuel return line. Also, the inlet channel formed by the double-wall spiral design is relatively large in cross section thereby permitting large quantities of return fuel and/or stored-up fuel to escape; this shortcoming extends unduly the length of time necessary to adequately fill the housing under conditions requiring a higher fuel level within the housing than is provided by the level of intank or auxiliary fuel.

Other recently developed devices are known whereby return fuel is injected into the reservoir by means of a venturi. The venturi sucked return fuel from the primary tank and injected the fuel tangential to the reservoir wall in a vortical motion. These devices were also relatively expensive to manufacture, and more importantly, were found to be ineffective in operation. That is, whenever fuel is returned under pressure tangential to a cylindrical container wall, the vortical motion of the fuel creates a low pressure zone at the center of the container. This inherent feature prohibited immediate suction of the fuel into the fuel intake since the intake was located at the center of the reservoir.

Furthermore, after extensive testing of both of these above mentioned later designs, a relatively low flow rate gain into the reservoir has been demonstrated. In addition, none of the earlier designs provided sufficient performance that would allow closing off the top of the reservoir assembly. Thus, the amount of surface contact between the hot return fuel and intank fuel was high, thereby allowing excessive heat transfer between return fuel and intank fuel; this condition creates unwanted gas vapor within the primary tank.

SUMMARY OF THE INVENTION

The present invention is a fuel pump reservoir for a fuel tank utilized by internal combustion engines. The fuel storage container may be of any configuration providing it has an opening for the suction conduit and an opening or receiver for receiving return fuel. The jet-receiver combination can be located at any angle and/or attitude with respect to the fuel suction conduit, however, it is preferable to locate the centerline of the nozzle at the center of the receiver and perpendicular to its plane. The nozzle is positioned external of the container near the receiver, and is preferably aimed toward the centerline of the intake or suction conduit within the reservoir. Intank fuel is entrained from the primary tank through the fuel receiver thereby greatly increasing the fuel flow rate into the reservoir.

It is, therefore, an object of this invention to supply an intank mounted, constant displacement, automotive fuel pump, with reserve supply of fuel at all driving attitudes, injector flows, and primary fuel tank levels.

It is another object of this invention to reduce harmful fuel emissions by reducing the amount of gas vapor within the primary tank through minimization of heat transfer between return line fuel and intank fuel while simultaneously maximizing the amount of fuel available at the fuel intake line.

It is a further object of this invention to increase the flow rate between the return line and the fuel receiver so as to provide larger quantities of fuel within the fuel reservoir for any given fuel return rate.

It is yet another object of this invention to provide an intank auxiliary fuel reservoir which can be of any geometrical configuration, thus greatly lending itself to any possible primary tank design.

It is still a further object of this invention to provide a fuel collecting and storing apparatus of simple design lending itself to very economical construction.

These and other objects, features and advantages of the present invention will become more obvious from the following description when taken in conjunction with the accompanying drawings which show, for purposes of illustration only, one embodiment in accordance with the present invention.

DETAILED DESCRIPTION OF THE PREFERRED EMBODIMENT

Figure 1:
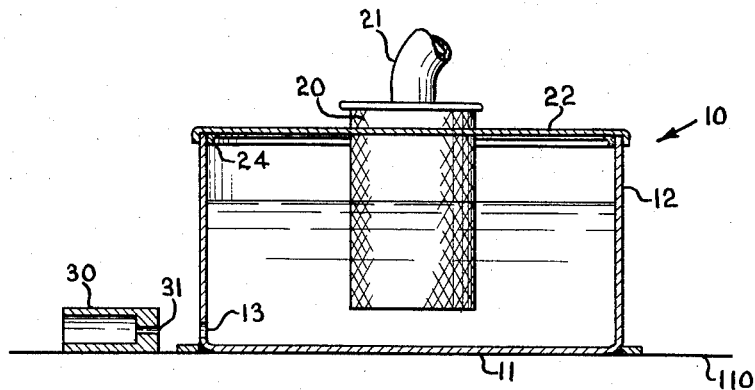
FIG. 1 is an elevational cross-sectional view of a fuel collecting and storing device in accordance with the preferred embodiment of the present invention taken along section line I—I of FIG. 2.
Figure 2:
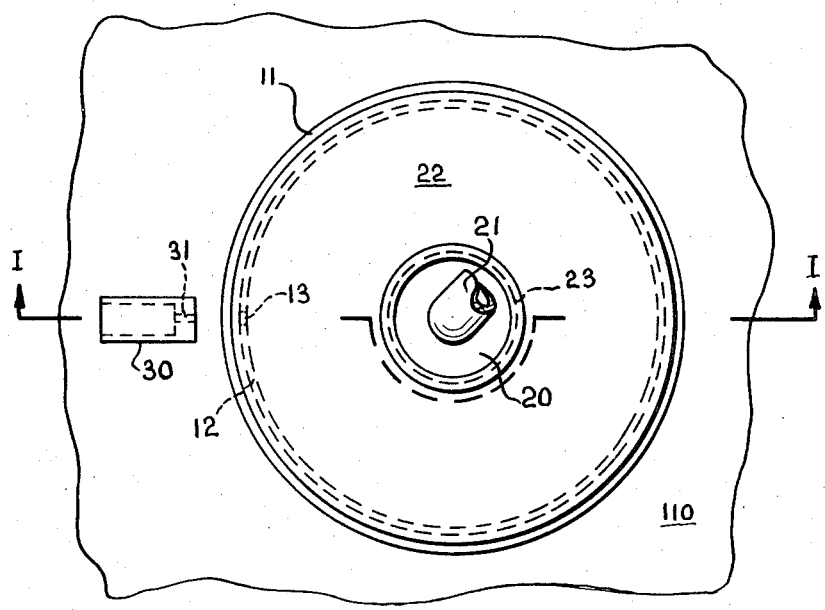
FIG. 2 is a plan view of the device illustrated in FIG. 1.

Referring now to the drawings, wherein like reference numerals are used throughout the views thereof to designate corresponding parts, reference numerals 110 designate the bottom of the primary fuel tank. The intank fuel pump reservoir or fuel storage container 10 is arranged essentially centrally within the primary fuel tank, at or near the fuel tank bottom 110. The reservoir 10 is shown as being of cylindrical form, having a circular base 11 and a side wall 12 extending upwardly therefrom. However, it should be noted that with this invention the container may be of any configuration since the shape of the container is not critical as it was with prior art designs. The fuel intake means, fuel pump, or the intank line for a fuel pump, is disposed within reservoir 10 and is positioned at or near the base 11 of reservoir 10. The fuel intake means is shown as a filter 20 with a fuel intake line 21 extending upwardly therefrom.

Since the present invention is more efficient than any fuel storage means used heretofore, it is possible to close off the reservoir from the fuel in the primary tank. By so doing, the amount of heat transferred from hot return fuel to intank fuel is greatly decreased thereby lowering the unfavorable gas vapor emissions within the primary tank. This feature is accomplished with a top or cover 22 which is secured to wall 12. One method of attaching top 22 to wall 12 is by press-fitting top 22 onto wall 12, the top 22 being held to wall 12 by a flexible ring 24. Of course, other conventional means for securing top 22 to wall 12 may also be used. Top 22 has an aperture 23 therethrough for receiving filter 20.

Wall 12 of reservoir 10 has an aperture 13 therethrough which form the fuel receiving means. Here again, the relative size and shape of aperture 13 is not critical to the successful application of the invention. However, to insure full use of intank fuel, the aperture is located in close proximity to base 11 of reservoir 10. Preferably aperture 13 should be of circular configuration with an appropriate diameter ratio, jet to receiver, dependent upon the amount of return flow. That is, the reservoir's effectiveness can be optimized for any given return flow rate by properly sizing aperture 13.

A fuel jet or nozzle 30 is mounted to the fuel tank bottom 110 adjacent to the fuel receiving aperture 13. Any suitable means of mounting the nozzle 30 to the fuel tank bottom 110 may be used, or if desired, nozzle 30 can be mounted directly to base 11 of the reservoir 10. In the preferred embodiment, the axis of nozzle 30 is essentially parallel to base 11 of reservoir 10. Where reservoir 10 is manufactured from metal, nozzle 30 may be assembled to base 11 in any conventional manner such as welding or a snap-type fitting may be made where nozzle 30 would be put in place by snapping it into a receiving structure formed on base 11. Where reservoir 10 is fabricated from a thermoplastic material, nozzle 30, base 11, wall 12, and top 22 may all be one piece. As is illustrated in the drawings, the terminal end of nozzle 30 is aimed at the fuel receiving aperture 13, that is, the axis of nozzle 30 is perpendicular to the plane of aperture 13 and preferably perpendicular to the axis of fuel filter 20. Also, for most efficient use of the invention, the axis of nozzle 30 should pass through the center of aperture 13. The combination of nozzle 30 and aperture 13 may be positioned at any angle or attitude with respect to the axis of fuel filter 20, however, it is preferable to have the axis of the jet-receiver intersect or near to intersecting the axis of fuel filter 20; this insures the shortest flow path between the return fuel and the fuel intake means. Jet or nozzle 30 increases the flow velocity of the return fuel by means of the flow restricting orifice 31 formed at its terminal end. Orifice 31 can be a square-edged orifice or nozzle 30 could be a convergent type nozzle; any type of flow restricting means which would provide the necessary jet-action is permissible.

As pointed out above, the present invention is of particular significance and advantage if used in conjunction with an internal combustion engine of the injection type. As is known with gasoline injection systems, even at full load or full throttle, only a fractional part of the supplied fuel quantity is injected into the engine whereas the considerably larger residual quantity of fuel discharged from the pump is conducted back into the fuel tank.

The fuel returns to the primary fuel tank by means of a return line (not shown) which line is suitably connected to nozzle 30. The invention operates on the principle of a jet-receiver fluid amplifier. This means that fluid flow into reservoir 10 is greater than the flow rate of the fluid discharged from jet 30. The additional flow rate is obtained by entraining fluid from the primary tank in which the reservoir is located. This concept has been tested and has demonstrated flow rate gains higher than 3.3. This is, the quantity of fluid entering the receiver is 3.3 times greater than the quantity of fluid discharged from the jet or nozzle 30.

By not allowing the return fuel to mix with the majority of intank fuel, the amount of heat introduced into the primary fuel tank is minimized. Since the hotter return fuel and entrained intank fuel are immediately reused by the fuel pump, and since fuel within the reservoir is prevented from mixing with intank fuel, the temperature rise of fuel within the primary tank is reduced, thereby obtaining an improvement in unfavorable gas emissions.

While mention has been made throughout of a suction conduit, or a filter 20 and an intake line 21, the supply fuel pump could itself be positioned or attached to base 11 of reservoir 10; this is possible since with this invention a higher level of fuel is maintained at the pump inlet than would be possible through the use of prior art designs. Thus, when the motor vehicle is accelerating, decelerating, or cornering, the fuel in the primary tank is removed from the pump inlet (assuming the case where the reservoir is not covered), the auxiliary reservoir would provide the fuel pump with a fuel supply until the acceleration, deceleration or cornering is completed and fuel in the primary tank is returned to the inlet of the pump.

While I have shown and described one embodiment in accordance with the present invention, it is understood that the same is not limited thereto but is susceptible to many changes and modifications within the spirit and scope of the present invention and I, therefore, do not wish to be limited to the particular details shown and described herein but intend to cover all such modifications and changes as are encompassed by the scope of the intended claims.

I claim:

1. A fuel reservoir for a fuel pump's intake line or the like for internal combustion engines wherein the excess of fuel delivered to the engine is returned to the fuel tank and wherein the intake line or the like is disposed within said reservoir comprising:
    wall means forming a storage space at the fuel tank bottom;
    fuel receiving aperture means for receiving intank and return fuel formed through said wall means in proximity to the bottom of the fuel tank; and
    fuel return line means for returning the excess fuel from said internal combustion engine, said return line means terminating in proximity to, and externally of, said wall means adjacent said fuel receiving aperture means operative to direct the excess fuel stream through said receiving aperture means.

2. In combination with a fuel intake line or the like utilized by intank internal combustion engine fuel pumps, a fluid amplified auxiliary reservoir disposed about said intake line or the like comprising:
    wall means forming a fuel storage space at the fuel tank bottom, said wall means having a fluid receiving aperture therethrough adjacent the bottom of said wall means; and
    a fuel return jet-action nozzle for increasing the velocity of the return fuel, said nozzle terminating in proximity to said fluid receiving aperture and aimed generally on line with said fluid receiving aperture.

* * * * *